United States Patent
Kim et al.

(10) Patent No.: US 11,812,093 B2
(45) Date of Patent: Nov. 7, 2023

(54) LUMINANCE DECREASE FOR SAME THUMBNAIL IMAGES

(71) Applicant: LG ELECTRONICS INC., Seoul (KR)

(72) Inventors: Yunam Kim, Seoul (KR); Seokhun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/770,379

(22) PCT Filed: Oct. 24, 2019

(86) PCT No.: PCT/KR2019/014023
§ 371 (c)(1),
(2) Date: Apr. 20, 2022

(87) PCT Pub. No.: WO2021/080036
PCT Pub. Date: Apr. 29, 2021

(65) Prior Publication Data
US 2022/0385968 A1 Dec. 1, 2022

(51) Int. Cl.
*G09G 5/10* (2006.01)
*H04N 21/431* (2011.01)
(Continued)

(52) U.S. Cl.
CPC ........... *H04N 21/4318* (2013.01); *G09G 5/10* (2013.01); *H04N 1/00448* (2013.01);
(Continued)

(58) Field of Classification Search
CPC ........... H04N 21/4318; H04N 1/00448; H04N 21/4402; H04N 2201/0089; H04N 21/4436; H04N 21/431; H04N 21/44008; G09G 5/10; G09G 2320/0646; G09G 2320/046; G09G 2330/022; G09G 2330/12; G09G 3/2092; G09G 2370/027; G09G 2380/16; G09G 3/3225
See application file for complete search history.

(56) References Cited

U.S. PATENT DOCUMENTS

2007/0146237 A1 6/2007 Lee
2007/0266345 A1* 11/2007 Cok ..................... G09G 3/3225
345/101

(Continued)

FOREIGN PATENT DOCUMENTS

KR 10-2007-0068795 A 7/2007
KR 10-2008-0113989 A 12/2008
(Continued)

*Primary Examiner* — Rodney Amadiz
(74) *Attorney, Agent, or Firm* — Birch, Stewart, Kolasch & Birch, LLP

(57) ABSTRACT

A display device includes a display and a controller. The controller may obtain whether at least two or more thumbnail images of the plurality of thumbnail images are identical, and control to display the plurality of photo images on the display by executing the slide show in a deterioration prevention mode from among a normal mode and the deterioration prevention mode when the at least two or more thumbnail images of the plurality of thumbnail images are identical.

19 Claims, 14 Drawing Sheets

(51) Int. Cl.
*H04N 1/00* (2006.01)
*H04N 21/4402* (2011.01)

(52) U.S. Cl.
CPC . *H04N 21/4402* (2013.01); *G09G 2320/0646* (2013.01); *H04N 2201/0089* (2013.01)

(56) References Cited

U.S. PATENT DOCUMENTS

| | | | | |
|---|---|---|---|---|
| 2011/0037781 | A1* | 2/2011 | Kangas | G09G 3/3406 |
| | | | | 345/690 |
| 2011/0081088 | A1* | 4/2011 | Xiao | G06V 20/10 |
| | | | | 382/218 |
| 2011/0298818 | A1* | 12/2011 | Mori | G09G 3/3208 |
| | | | | 345/589 |
| 2013/0063500 | A1* | 3/2013 | Oka | H04N 9/3155 |
| | | | | 345/690 |
| 2015/0310655 | A1 | 10/2015 | Hill et al. | |
| 2016/0217724 | A1 | 7/2016 | Kim | |
| 2017/0004753 | A1* | 1/2017 | Kim | G09G 3/3233 |

FOREIGN PATENT DOCUMENTS

| | | | |
|---|---|---|---|
| KR | 10-2016-0091175 A | 8/2016 | |
| WO | WO 2007/042744 A1 | 4/2007 | |

* cited by examiner

LUMINANCE DECREASE FOR SAME THUMBNAIL IMAGES

CROSS REFERENCE TO RELATED APPLICATIONS

This application is the National Phase of PCT/KR2019/014023 filed on Oct. 24, 2019, which is hereby expressly incorporated by reference into the present application.

BACKGROUND OF THE DISCLOSURE

Field

Embodiments relates to a display device.

Discussion of the Related Art

Recently, digital TV services using wired or wireless communication networks are becoming common. The digital TV services may provide various services that cannot be provided by existing analog broadcasting services.

For example, for IPTV (Internet Protocol Television) and smart TV services, which are types of digital TV services, interactivity is provided so that users can actively select the types of programs to watch, the viewing time, and the like. IPTV and smart TV services may provide various additional services, such as Internet search, home shopping, online games, etc., based on such interactivity.

Content such as a photo or a video is provided to a display device. In the display device, voltage or current is continuously supplied to each pixel in order to implement different levels of luminance of each pixel. Accordingly, when the display device is used for a long time, an afterimage may be generated, and in particular, the afterimage is severe in a display device employing a liquid crystal display panel or an organic light emitting display panel. This is due to the material properties of the liquid crystal display panel or the organic light emitting display panel. In particular, the organic light emitting material of the organic light emitting display panel is vulnerable to deterioration. Accordingly, when voltage or current is supplied to the organic light emitting display panel and deterioration is continuously caused, the afterimage may become severe.

In particular, in a slide show, a series of photo images are switched and displayed in a predetermined time unit. In this case, when the series of photo images are identical photo images or there is little difference in luminance between adjacent photo images, for example, the afterimage becomes severe in still images. In a slide show, photo images are switched and displayed infinitely repeatedly by a process of displaying the first photo image again after the last photo image is displayed. Since such an afterimage interferes with the user's immersion in viewing, it must be urgently resolved.

SUMMARY OF THE DISCLOSURE

Embodiments provide a display device capable of improving image quality by preventing the occurrence of an afterimage.

Embodiments provide a display device capable of minimizing computational burden.

Embodiments provide a display device capable of reducing power consumption.

According to an aspect of an embodiment, a display device includes a display configured to display a thumbnail list including thumbnail images respectively corresponding to a plurality of photo images; and a controller configured to perform control to execute a slide show in one of a normal mode and a deterioration prevention mode. The controller may obtain whether at least two or more thumbnail images of the plurality of thumbnail images are identical, and perform control to display the plurality of photo images on the display by executing the slide show in the deterioration prevention mode when the at least two or more thumbnail images of the plurality of thumbnail images are identical.

According to another aspect of an embodiment, a method for controlling a display device includes displaying a thumbnail list including thumbnail images respectively corresponding to a plurality of photo images on a display; obtaining whether at least two or more thumbnail images of the plurality of thumbnail images are identical; and displaying the plurality of photo images by executing the slide show in the deterioration prevention mode when the at least two or more thumbnail images of the plurality of thumbnail images are identical.

Advantageous Effects

According to an embodiment, it is possible to analyze a plurality of thumbnail images for a slide show before executing the slide show, select one of the normal mode and the deterioration prevention mode, and execute the slide show in the selected mode to display a corresponding plurality of photo images, thus improving image quality by preventing afterimages from occurring.

According to an embodiment, it is possible to minimize the computational burden by determining a mode for executing the slide show by comparing a plurality of thumbnail images with a small capacity instead of a plurality of photo images with a large capacity.

According to an embodiment, it is possible to decrease the luminance values of the plurality of photo images displayed as the slide show or display a black screen or a screen saver screen instead of the plurality of photo images when the slide show is executed in the deterioration prevention mode, thus reducing power consumption.

DETAILED DESCRIPTION OF THE EMBODIMENTS

Hereinafter, embodiments relating to the present invention will be described in detail with reference to the accompanying drawings. The suffixes "unit" for components used in the description below are assigned or mixed in consideration of easiness in writing the specification and do not have distinctive meanings or roles by themselves.

Figure 1:
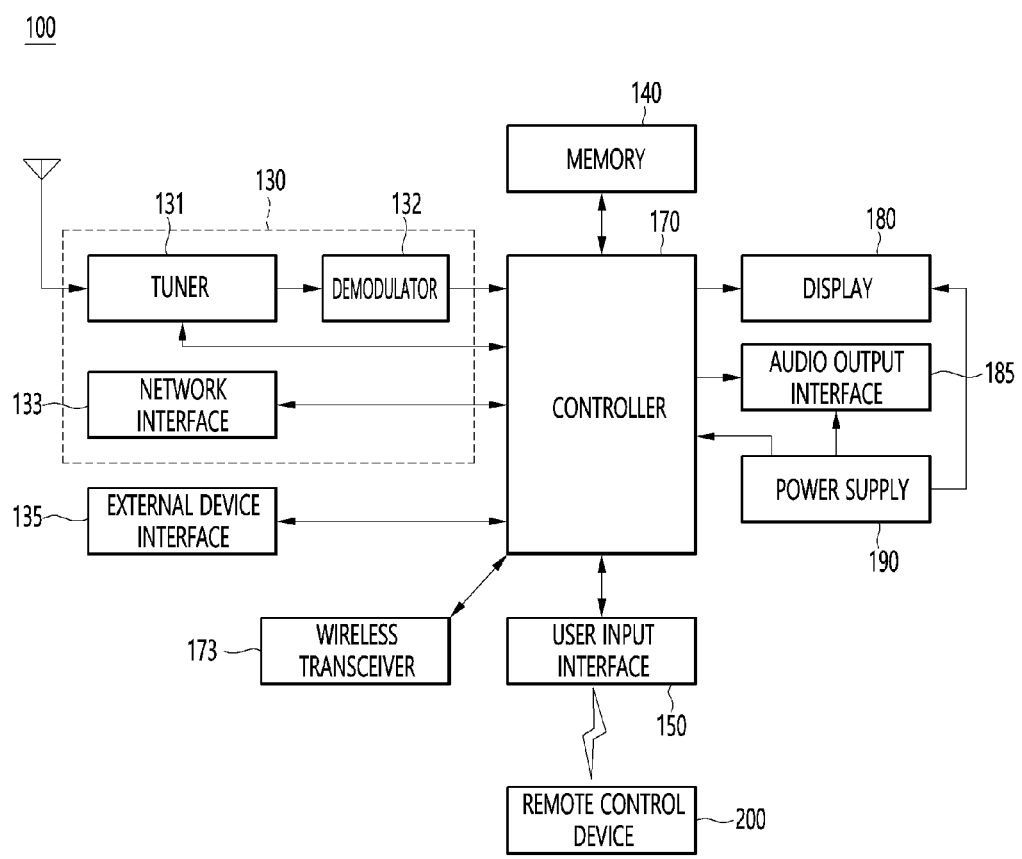
FIG. 1 is a diagram illustrating an image display apparatus according to an embodiment.

FIG. 1 is a diagram illustrating an image display apparatus according to an embodiment.

Referring to FIG. 1, the display apparatus 100 according to an embodiment includes a broadcast reception unit 130, an external device interface 135, a memory 140, a user input interface 150, a sensor (not illustrated), a controller 170, a display 180, an audio output interface 185, and a power supply 190.

The broadcast reception unit 130 includes a tuner 131, a demodulator 132, a network interface 133, and an external device interface 135.

The tuner 131 was able to tune into a specific broadcasting channel according to the channel selection command. The tuner 131 may receive a broadcast signal for the selected specific broadcast channel.

The demodulator 132 can separate the received broadcast signal into a video signal, an audio signal, and a data signal related to a broadcast program, and can restore the separated video signal, audio signal, and data signal to an outputtable form.

The network interface 133 may provide an interface for connecting the display apparatus 100 to a wired/wireless network including an Internet network. The network interface 133 may transmit or receive data with other users or other electronic devices through the connected network or another network linked to the connected network.

The network interface 133 may access a predetermined web page through the connected network or another network linked to the connected network. That is, by accessing a predetermined web page through a network, it is possible to transmit or receive data with a corresponding server.

In addition, the network interface 133 may receive content or data provided by a content provider or a network operator. That is, the network interface 133 may receive contents such as movies, advertisements, games, VODs, broadcast signals, etc. and related information provided from the contents provider or the network provider through the network.

In addition, the network interface 133 may receive update information and update files of firmware provided by the network operator, and may transmit data to the Internet or a content provider or network operator.

The network interface 133 may select and receive a desired application from among applications open to the public through a network.

The external device interface 135 may receive an application or an application list in an adjacent external device and transmit it to the controller 170 or the memory 140.

The external device interface 135 may provide a connection path between the display device 100 and an external device. The external device interface 135 may receive one or more of an image and audio output from an external device connected to the display device 100 wirelessly or by wire, and transmit it to the controller 170. The external device interface 135 may include a plurality of external input terminals. The plurality of external input terminals may include an RGB terminal, one or more HDMI (High Definition Multimedia Interface) terminals, and a component component) terminal.

An image signal of an external device input through the external device interface 135 may be output through the display 180. A voice signal of an external device input through the external device interface 135 may be output through the audio output interface 185.

The external device connectable to the external device interface 135 may be any one of a set-top box, a Blu-ray player, a DVD player, a game machine, a sound bar, a smartphone, a PC, a USB memory, and a home theater, but this is only an example.

In addition, some content data stored in the display apparatus 100 may be transmitted to another user registered in advance in the display apparatus 100, a user selected from among other electronic devices, or a selected key device.

The memory 140 may store a program for each signal processing and control in the controller 170, and may store a signal-processed image, audio, or data signal.

In addition, the memory 140 may perform a function for temporarily storing the video, audio, or data signal input from the external device interface 135 or the network interface 133, and store information about a predetermined image through the channel storage function.

The memory 140 stores an application or an application list input from the external device interface 135 or the network interface 133.

The display apparatus 100 may reproduce content files (movie files, still image files, music files, document files, application files, etc.) stored in the memory 140 and provide them to the user.

The user input interface 150 may transmit a signal input by the user to the controller 170 or transmit a signal from the controller 170 to the user. For example, the user input interface 150 receives and process control signals such as power on/off, channel selection, and screen setting from the remote control device 200 according to various communication methods such as Bluetooth, WB (Ultra Wideband), ZigBee method, RF (Radio Frequency) communication method or infrared (IR) communication method, or process the control signal from the controller 170 to be transmitted to the remote control device (200).

Also, the user input interface 150 may transmit a control signal input from a local key (not shown) such as a power key, a channel key, a volume key, and a setting value to the controller 170.

The image signal processed by the controller 170 may be input to the display 180 and displayed as an image corresponding to the image signal. Also, the image signal processed by the controller 170 may be input to an external output device through the external device interface 135.

The audio signal processed by the controller 170 may be audio output to the audio output interface 185. Also, the audio signal processed by the controller 170 may be input to an external output device through the external device interface 135.

In addition, the controller 170 may control overall operations in the display apparatus 100.

Also, the controller 170 may control the display apparatus 100 according to a user command input through the user input interface 150 or an internal program. The controller 170 may access a network and allow a user to download an application or an application list desired by the user into the display apparatus 100.

The controller 170 allows the channel information selected by the user to be output through the display 180 or the audio output interface 185 together with the processed image or audio signal.

In addition, the controller 170 allows an image signal or an audio signal from an external device, for example, a camera or camcorder, input through the external device interface 135 to displayed on the display 180 or the audio output interface 185 according to an external device image reproduction command received through the user input interface 150.

Meanwhile, the controller 170 may control the display 180 to display an image. The controller 170 allows a broadcast image input through the tuner 131, an external input image input through the external device interface 135, an image input through the network interface, or an image sored in the memory 140 to be displayed on the display 180. In this case, the image displayed on the display 180 may be a still image or a moving image, or may be a 2D image or a 3D image.

In addition, the controller 170 may control the content stored in the display device 100, received broadcast content, or external input content input from the outside to be reproduced, and the content includes a broadcast image, an external input image, and an audio file, a still image, a connected web screen, and a document file may be in various forms.

The wireless transceiver 173 may communicate with an external device through wired or wireless communication. The wireless transceiver 173 may perform short range communication with an external device. To this end, the wireless transceiver 173 may support short-distance communication by using at least one of Bluetooth (Bluetooth™ BLE (Bluetooth Low Energy)), RFID (Radio Frequency Identification), infrared communication (Infrared Data Association; IrDA), UWB (Ultra Wideband), ZigBee, NFC (Near Field Communication), Wi-Fi (Wireless-Fidelity), Wi-Fi Direct, and Wireless USB (Wireless Universal Serial Bus) technologies.

Here, the other display device 100 is a wearable device capable of exchanging (or interworking) data with the display device 100 according to the present invention, for example, a smart watch, smart glass, HMD (head mounted display), mobile terminals such as smart phones. Furthermore, when the detected wearable device is an authenticated device to communicate with the display apparatus 100 according to the present invention, the controller 170 transmits at least a portion of data processed by the display apparatus 100 to the wireless transceiver 173 to the wearable device. Accordingly, the user of the wearable device may use data processed by the display apparatus 100 through the wearable device.

The display 180 converts the image signal, the data signal, the OSD signal processed by the controller 170, or the image signal and the data signal received from the external device interface 135 into R, G, and B signals, respectively, and generate drive signal.

Meanwhile, since the display device 100 shown in FIG. 1 is merely an exemplary embodiment, some of the illustrated components may be integrated, added, or omitted according to the specifications of the actually implemented display device 100.

That is, two or more components may be combined into one component, or one component may be subdivided into two or more components if necessary. In addition, the function performed in each block is for explaining the embodiment of the present invention, and the specific operation or device does not limit the scope of the present invention.

According to another embodiment, the display apparatus 100 does not include the tuner 131 and the demodulator 132, but receive and reproduce image through the network interface 133 or the external device interface 135.

For example, the display apparatus 100 is divided into an image processing apparatus such as a set-top box for receiving broadcast signals or contents according to various network services, and a content reproduction apparatus which reproduces content input from the image processing apparatus, can be implemented.

In this case, the operating method of the display apparatus according to the embodiment to be described below may be performed one of the display apparatus 100 as described with reference to FIG. 1 or the content reproducing apparatuses having the display 180 and the audio output interface 185.

Next, a remote control apparatus according to an embodiment will be described with reference to FIGS. 2 to 3.

Figure 2:
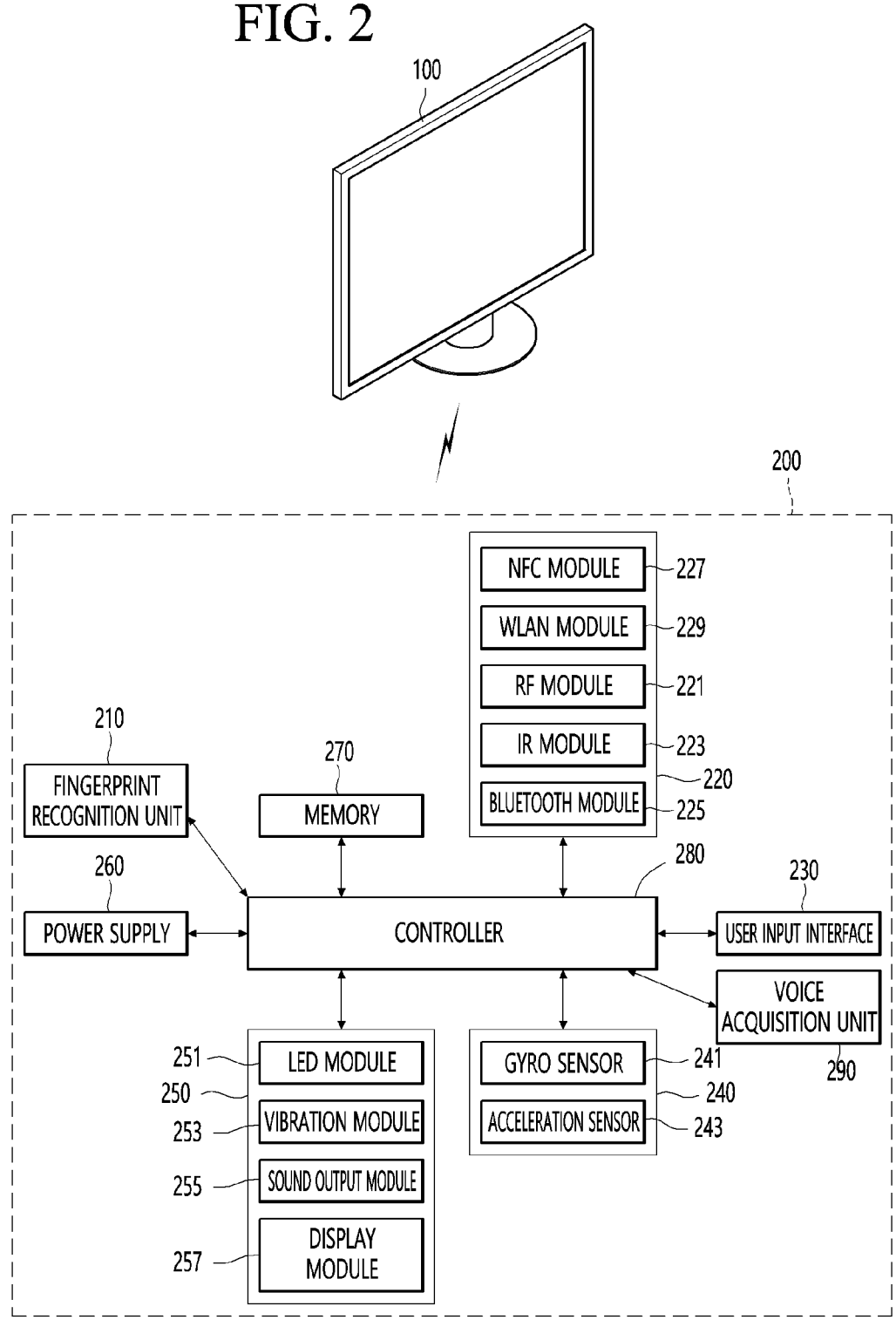
FIG. 2 is an example of a block diagram of a remote controller according to an embodiment.

FIG. 2 is an example of a block diagram of a remote controller according to an embodiment. FIG. 3 shows an example of an actual configuration of a remote control device according to an embodiment.

First, referring to FIG. 2, the remote control device 200 includes a fingerprint recognition unit 210, a wireless transceiver 220, a user input interface 230, a sensor 240, an output interface 250, and a power supply 260, a memory 270, a controller 280, and a voice acquisition unit 290.

Referring to 2, the wireless transceiver 220 transmits/receives a signal to and from any one of the display devices according to the above-described embodiments.

The remote control device 200 includes an RF module 221 capable of transmitting and receiving signals to and from the display device 100 according to the RF communication standard, and IR module 223 capable of transmitting and receiving signals to and from the display device 100 according to the IR communication standard. In addition, the remote control device 200 may include a Bluetooth module 225 capable of transmitting and receiving signals to and from the display device 100 according to the Bluetooth communication standard. In addition, the remote control device 200 includes an NFC module 227 capable of transmitting and receiving signals to and from the display device 100 according to the NFC (Near Field Communication) communication standard, and includes a WLAN module 229 capable of transmitting and receiving signals to and from the display device 100 capable of transmitting and receiving signals to and from the display device 100 according to the WLAN (Wireless LAN) communication standard.

In addition, the remote control device 200 transmits a signal containing information about the movement of the remote control device 200 to the display device 100 through the wireless transceiver 220.

On the other hand, the remote control device 200 may receive a signal transmitted by the display device 100 through the RF module 221, and transmit commands related to power on/off, channel change, volume change, etc. to the display device 100 through the IR module 223 as necessary.

The user input interface 230 may include a keypad, a button, a touch pad, or a touch screen. The user may input a command related to the display apparatus 100 to the remote control apparatus 200 by manipulating the user input interface 230. When the user input interface 230 includes a hard key button, the user may input a command related to the display device 100 to the remote control device 200 through a push operation of the hard key button. This will be described with reference to FIG. 3.

Figure 3:
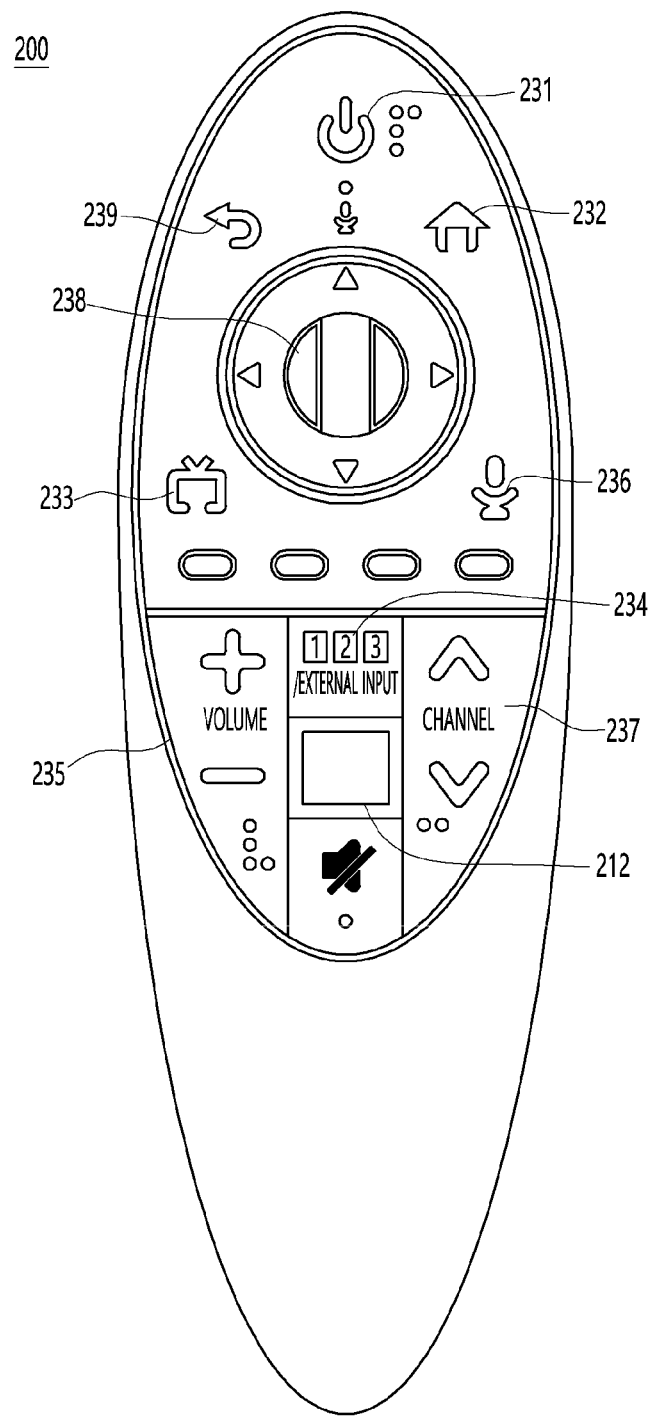
FIG. 3 shows an example of an actual configuration of a remote control device according to an embodiment.

Referring to FIG. 3, the remote control device 200 may include a plurality of buttons. The plurality of buttons include a fingerprint recognition button 212, a power button 231, a hum button 232, a live button 233, an external input button 234, a volume control button 235, a voice recognition button 236, a channel change button 237, a confirmation button 238 and a back button 239.

The fingerprint recognition button 212 may be a button for recognizing a user's fingerprint. In an embodiment, the fingerprint recognition button 212 may perform a push operation, and thus may receive a push operation and a fingerprint recognition operation. The power button 231 may be a button for turning on/off the power of the display apparatus 100. The home button 232 may be a button for moving to a home screen of the display apparatus 100. The live button 233 may be a button for displaying a real-time broadcast program. The external input button 234 may be a button for receiving an external input connected to the display apparatus 100. The volume adjustment button 235 may be a button for adjusting the volume output by the display device 100. The voice recognition button 236 may be a button for receiving a user's voice and recognizing the received voice. The channel change button 237 may be a button for receiving a broadcast signal of a specific broadcasting channel. The confirmation button 238 may be a button for selecting a specific function, and the back button 239 may be a button for returning to a previous screen.

FIG. 2 will be described again.

When the user input interface 230 includes a touch screen, the user may input a command related to the display apparatus 100 to the remote control apparatus 200 by touching a soft key of the touch screen. In addition, the user input interface 230 may be provided with various types of input means that the user can operate, such as a scroll key or a jog key, and this embodiment does not limit the scope of the present invention.

The sensor 240 may include a gyro sensor 241 or an acceleration sensor 243 and the gyro sensor 241 may sense information about the motion of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance to the display 180 of the display device 100.

The output interface 250 may output an image or audio signal corresponding to an operation of the user input interface 230 or a signal transmitted from the display apparatus 100. Through the output interface 250, the user may recognize whether the user input interface 230 is operated or whether the display apparatus 100 is controlled.

For example, the output interface 250 has an LED module 251 that is turned on when the user input interface 230 is manipulated or a signal is transmitted and received with the display device 100 through the wireless transceiver 220, a vibration module that generates vibration 253, a sound output module 255 for outputting a sound, or a display module 257 for outputting an image.

In addition, the power supply 260 supplies power to the remote control device 200, and when the remote control device 200 does not move for a predetermined time, the power supply is stopped such that power consumption is reduced. The power supply 260 may resume power supply when a predetermined key provided in the remote control device 200 is operated.

The memory 270 may store various types of programs and application data required for control or operation of the remote control device 200. If the remote control device 200 transmits/receives a signal wirelessly through the display device 100 and the RF module 221, the remote control device 200 and the display device 100 transmit/receive a signal through a predetermined frequency band.

The controller 280 of the remote control device 200 stores information about a frequency band capable of wirelessly transmitting and receiving signals with the display device 100 paired with the remote control device 200 in the memory 270 and refer to it.

The controller 280 controls all matters related to the control of the remote control device 200. The controller 280 transmits a signal corresponding to a predetermined key operation of the user input interface 230 or a signal corresponding to the movement of the remote control device 200 sensed by the sensor 240 to the display device 100 through the wireless transceiver 220.

Also, the voice acquisition unit 290 of the remote control device 200 may acquire a voice.

The voice acquisition unit 290 may include at least one microphone 291, and may acquire a voice through the microphone 291.

Next, FIG. 4 will be described.

Figure 4:
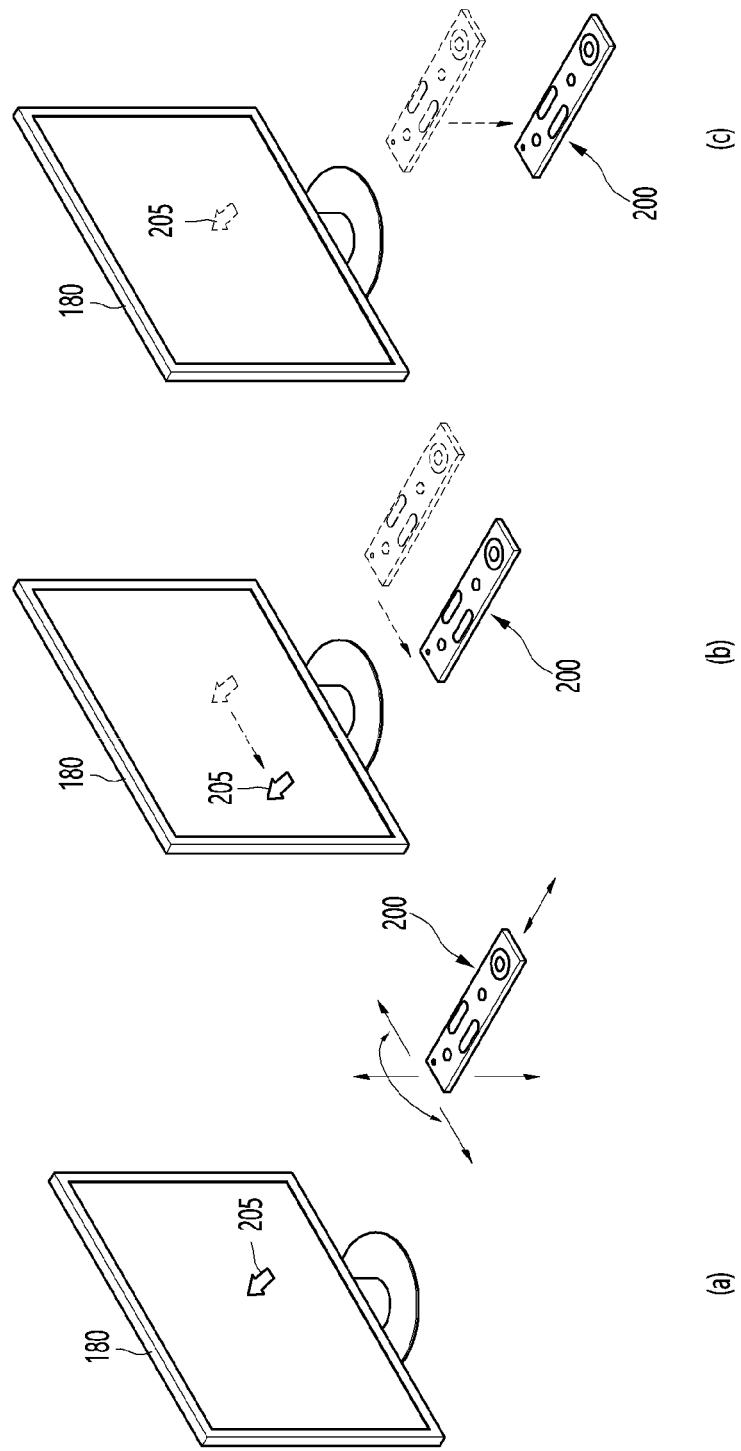
FIG. 4 shows an example of using a remote control device according to an embodiment.

FIG. 4 shows an example of using a remote control device according to an embodiment.

FIG. 4A(a) illustrates that a pointer 205 corresponding to the remote control device 200 is displayed on the display 180.

The user may move or play the remote control device 200 up, down, left and right. The pointer 205 displayed on the display 180 of the display apparatus 100 corresponds to the movement of the remote control apparatus 200. As shown in the figure, the remote control device 200 moves and displays the corresponding pointer 205 according to movement in 3D space, and thus, the remote controller 200 is named a spatial remote controller.

FIG. 4A(b) illustrates that, when the user moves the remote controller 200 leftward, the pointer 205 displayed on the display 180 of the image display apparatus correspondingly moves leftward.

Information on the movement of the remote controller 200, which is detected through a sensor of the remote controller 200, is transferred to the image display apparatus. The image display apparatus calculates the information on the movement of the remote controller 200 from coordinates of the pointer 205. The image display apparatus displays the pointer 205 in such a manner that the pointer 25 corresponds to the calculated coordinates.

FIG. 4A(c) illustrates a case where the user moves the remote controller 200 away from the display 180 in a state where a specific button within the remote controller 200 is held down. Accordingly, a selection area within the display 180, which corresponds to the pointer 205, is zoomed in so that the selection area is displayed in an enlarged manner.

Conversely, in a case where the user causes the remote controller 200 to approach the display 180, the selection area within the display 180, which corresponds to the pointer 205, is zoomed out so that the selection is displayed in a reduced manner.

On the other hand, in a case where the remote controller 200 moves away from the display 180, the selection area may be zoomed out, and in a case where the remote controller 200 approaches the display 180, the selection area may be zoomed in.

On the other hand, an upward or downward movement, or a leftward or rightward movement is not recognized in a state where a specific button within the remote controller 200 is held down. That is, in a case where the remote controller 200 moves away from or approaches the display 180, only a forward or backward movement is set to be recognized without the upward or downward movement, or the leftward or rightward movement being recognized. Only the pointer 205 moves as the remote controller 200 moves upward, downward, leftward, or rightward, in a state where a specific button within the remote controller 200 is not held down.

On the other hand, a moving speed or a moving direction of the pointer 205 corresponds to a moving speed or a moving direction of the remote controller 200, respectively.

Meanwhile, in the present specification, a pointer refers to an object displayed on the display 180 in response to an operation of the remote control device 200. Accordingly, objects of various shapes other than the arrow shape shown in the drawing are possible with the pointer 205. For example, it may be a concept including a fold, a cursor, a prompt, and a thick outline. In addition, the pointer 205 is displayed corresponding to any one point of the horizontal axis and the vertical axis on the display 180, as well as a plurality of points such as a line and a surface.

Figure 5:
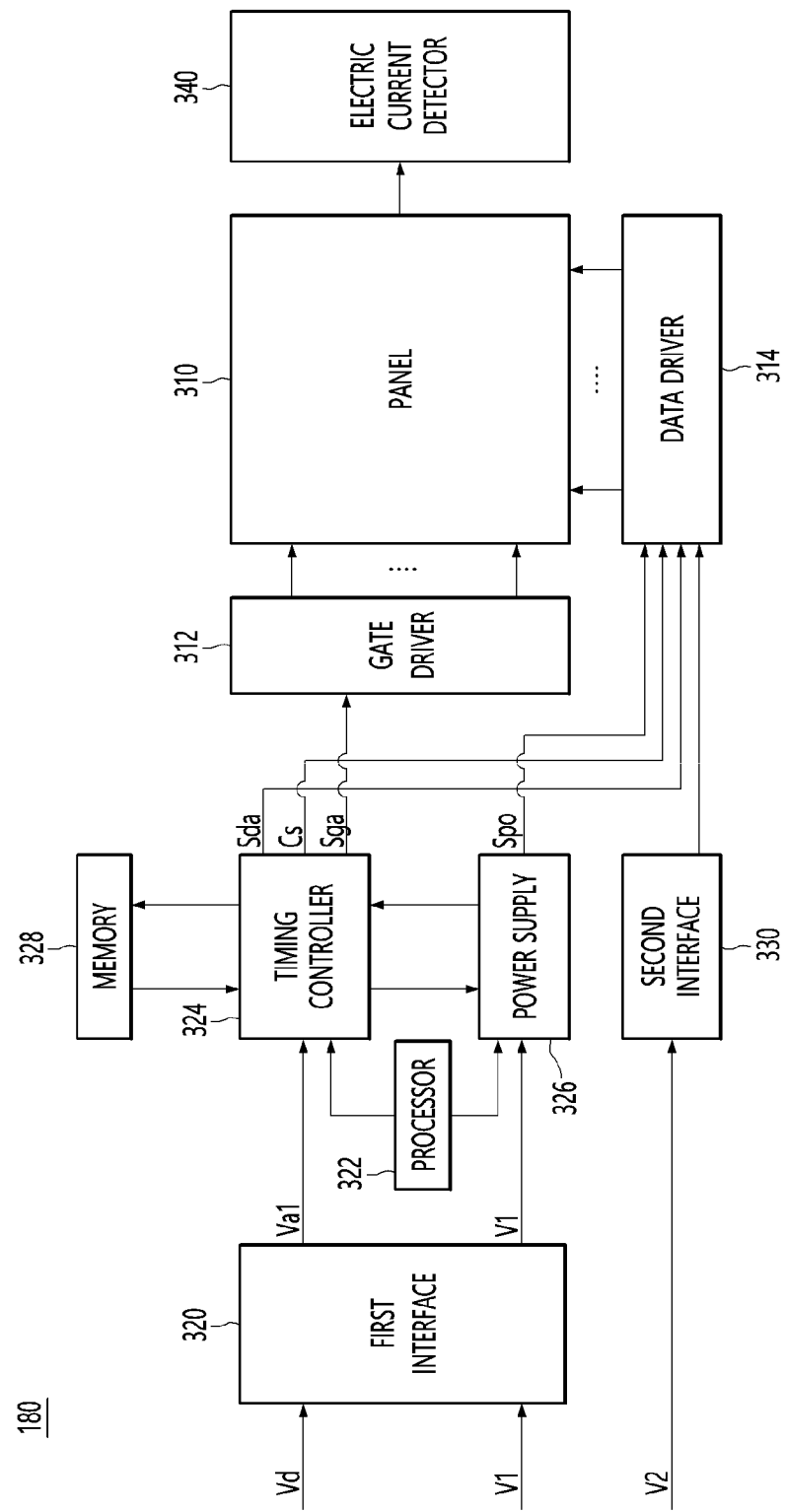
FIG. 5 is an internal block diagram of the display of FIG. 1 according to an exemplary embodiment.

FIG. 5 is an internal block diagram of the display of FIG. 1 according to an exemplary embodiment.

Referring to FIG. 5, the display 180 may include the OLED panel 310, a first interface 320, a second interface 330, a timing controller 324, a gate driver 312, a data driver 314, a memory 328, a processor 322, a power supply 326, an electric current detector 340, and so on.

The display 180 receives an image signal Vd, a first direct current power V1, and a second direct current power V2. Based on the image signal Vd, the display 180 display a predetermined image.

On the other hand, the first interface 320 within the display 180 receives the image signal Vd and the first direct current power V1 from the controller 170.

At this point, the first direct current power V1 is used for operation for each of the power supply 326 and the timing controller 324 within the display 180.

Next, the second interface 330 receives the second direct current power V2 from a power supply 190. On the other hand, the second direct current power V2 is input into the data driver 314 within the display 180.

Based on the image signal Vd, the timing controller 324 outputs a data drive signal Sda and a gate drive signal Sga.

For example, in a case where the first interface 320 converts the image signal Vd input, and outputs image signal va1 that results from the conversion, the timing controller 324 outputs the data drive signal Sda and the gate drive signal Sga based on the image signal va1 that results from the conversion.

The timing controller 324 further receives a control signal, the vertical synchronization signal Vsync, and so on, in addition to a video signal Vd from the controller 170.

The timing controller 324 outputs the gate drive signal Sga for operation of the gate driver 312 and the data drive signal Sda for operation of the data driver 314, based on the control signal, the vertical synchronization signal Vsync, and so on in addition to the video signal Vd.

In a case where the OLED panel 310 includes a subpixel for RGBW, the data drive signal Sda at this time is a data drive signal for a subpixel for RGBW.

On the other hand, the timing controller 324 further outputs a control signal Cs to the gate driver 312.

The gate driver 312 and the data driver 314 supplies a scanning signal and an image signal to the OLED panel 310 through a gate line GL and a data line DL according to the gate drive signal Sga and the data drive signal Sda, respectively, from the timing controller 324. Accordingly, a predetermined image is displayed on the OLED panel 310.

On the other hand, the OLED panel 310 includes an organic light-emitting layer. In order to display an image, many gate lines GL and many data lines DL are arranged to intersect each other in a matrix form, at each pixel that corresponds to the organic light-emitting layer.

On the other hand, the data driver 314 outputs a data signal to the OLED panel 310 based on the second direct current power V2 from the second interface 330.

The power supply 326 supplies various types of powers to the gate driver 312, the data driver 314, the timing controller 324, and so on.

The electric current detector 340 detects an electric current that flows through a subpixel of the OLED panel 310. The detected electric current is input into the processor 322 and or so for accumulated electric-current computation.

The processor 322 performs various types of control within the display 180. For example, the gate driver 312, the data driver 314, the timing controller 324, and so on are controlled.

On the other hand, the processor 322 receives information of the electric current that flows through the subpixel of the OLED panel 310, from the electric current detector 340.

Then, based on the information of the electric current that flows through the subpixel of the OLED panel 310, the processor 322 computes an accumulated electric current of a subpixel of each organic light-emitting diode (OLED) panel 210. The accumulated electric current computed is stored in the memory 328.

On the other hand, in a case where the accumulated electric current of the subpixel of each organic light-emitting diode (OLED) panel 210 is equal to or greater than an allowed value, the processor 322 determines the subpixel as a burn-in subpixel.

For example, in a case where the accumulated electric current of the subpixel of each organic light-emitting diode (OLED) panel 210 is 300000 A or higher, the subpixel is determined as a burn-in subpixel.

On the other hand, in a case where, among subpixels of each organic light-emitting diode (OLED) panel 210, an accumulated electric current of one subpixel approaches the allowed value, the processor 322 determines the one subpixel as expected to be a burn-in sub pixel.

On the other hand, based on the electric current detected in the electric current detector 340, the processor 322 determines a subpixel that has the highest accumulated electric current, as expected to be a burn-in subpixel.

Figure 6A:
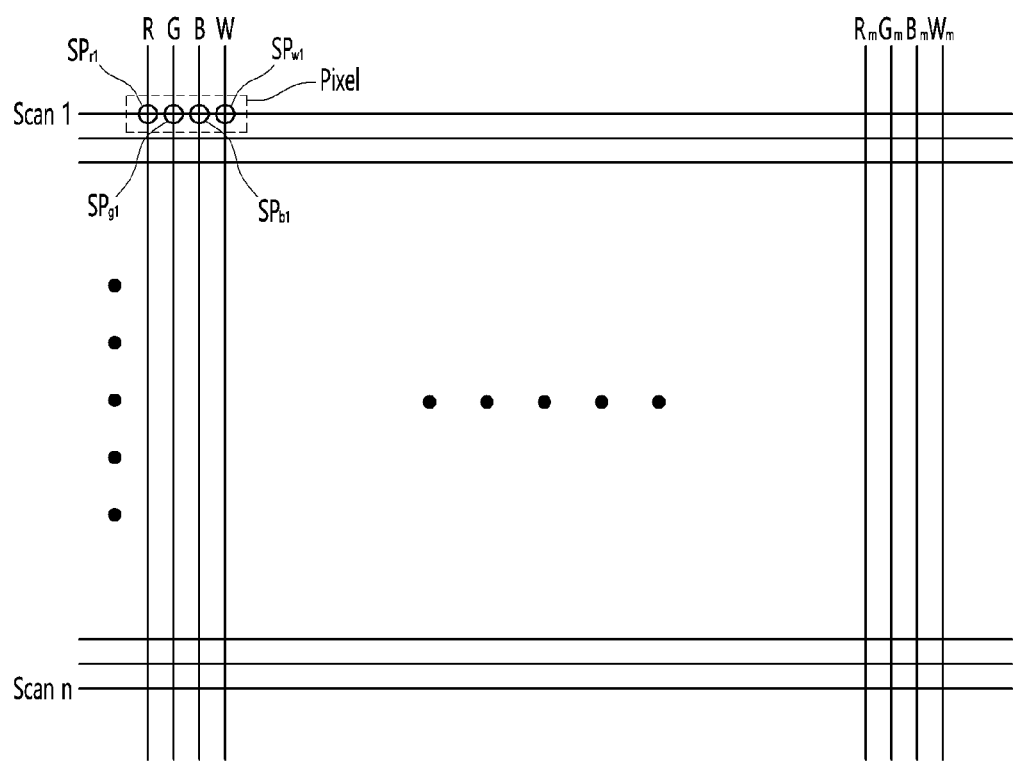
FIG. 6A and FIG. 6B are diagrams referred to in the description of the organic light emitting panel of FIG. 5.
Figure 6B:
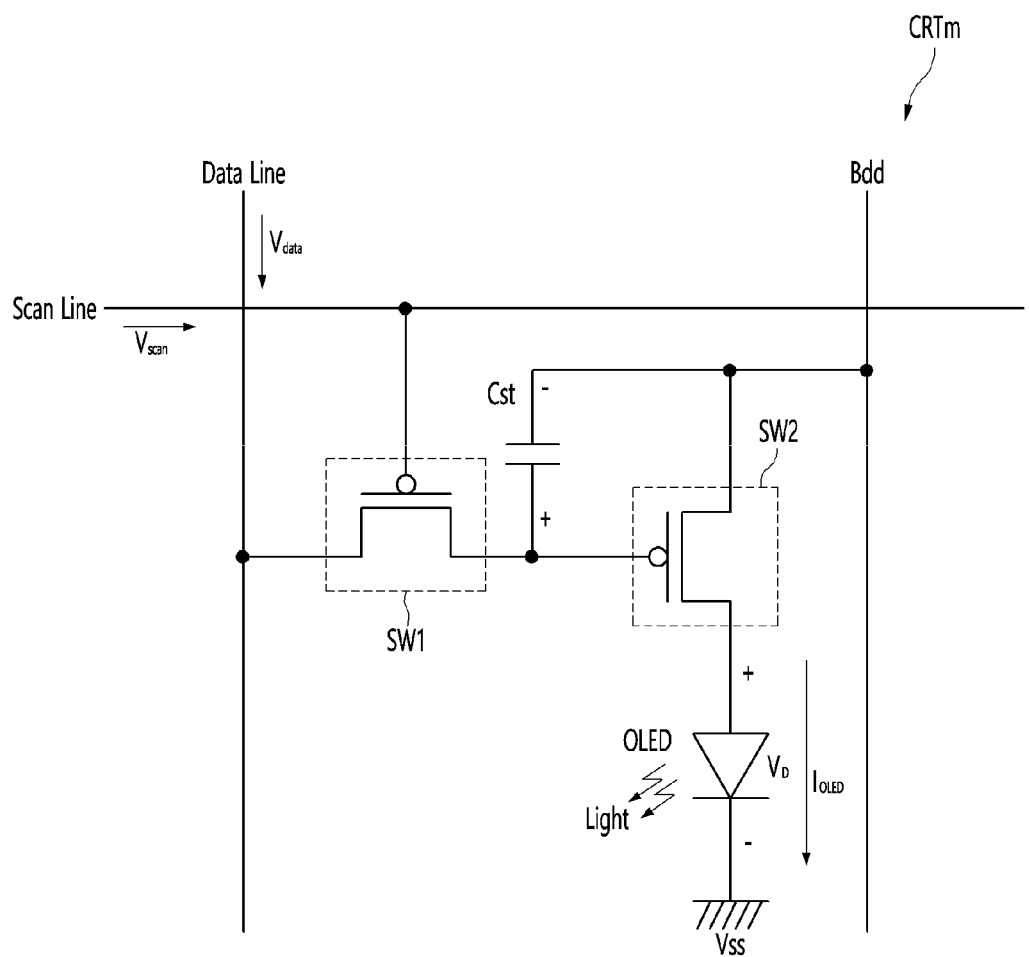

FIGS. 6A and 6B are diagrams that are referred to for description of the OLED panel in FIG. 5.

First, FIG. 6A is a diagram illustrating a pixel within the OLED panel 310.

With reference to the drawings, the OLED panel 310 includes a plurality of scan lines Scan 1 to Scan n and a plurality of data lines R1, G1, B1, W1 to Rm, Gm, Bm, Wm that intersect a plurality of scan lines Scan 1 to Scan n, respectively.

On the other hand, an area where the scan line and the data line within the OLED panel 310 intersect each other is defined as a subpixel. In the drawings, a pixel that includes a subpixel $SP_{r1}$, $SP_{g1}$, $SP_{b1}$, $SP_{w1}$ for RGBW is illustrated.

FIG. 6B illustrates a circuit of one subpixel within the OLED panel in FIG. 6A.

With reference to the drawings, an organic light-emitting subpixel circuit CRTm includes a switching element SW1, a storage capacitor Cst, a drive switching element SW2, and an organic light-emitting layer (OLED), which are active-type elements.

A scan line is connected to a gate terminal of the scan switching element SW1. The scanning switching element SW1 is turned on according to a scan signal Vscan input. In a case where the scan switching element SW1 is turned on, a data signal Vdata input is transferred to the gate terminal of the scan switching element SW2 or one terminal of the storage capacitor Cst.

The storage capacitor Cst is formed between the gate terminal and a source terminal of the drive switching element SW2. A predetermined difference between a data signal level transferred to one terminal of the storage capacitor Cst and a direct current (Vdd) level transferred to the other terminal of the storage capacitor Cst is stored in the storage capacitor Cst.

For example, in a case where data signals have different levels according to a pulse amplitude modulation (PAM) scheme, power levels that are stored in the storage capacitor Cst are different according to a difference between levels of data signals Vdata.

As another example, in a case where data signals have different pulse widths according to a pulse width modulation (PWM) scheme, power levels that are stored in the storage capacitor Cst are different according to a difference between pulse widths of data signals Vdata.

The drive switching element SW2 is turned on according to the power level stored in the storage capacitor Cst. In a case where the drive switching element SW2 is turned on, a drive electric current ($I_{OLED}$), which is in proportion to the stored power level, flows through the organic light-emitting layer (OLED). Accordingly, the organic light-emitting layer (OLED) performs a light-emitting operation.

The organic light-emitting layer (OLED) includes a light-emitting layer (EML) for RGBW, which corresponds to a subpixel, and includes at least one of the following layers: a hole implementation layer (HIL), a hole transportation layer (HTL), an electron transportation layer (ETL), and an electron implementation layer (EIL). In addition to these, the organic light-emitting layer includes a hole support layer and so on.

On the other hand, when it comes to a subpixel, the organic light-emitting layer outputs while light, but in the case of the subpixels for green, red, and blue, a separate color filter is provided in order to realize color. That is, in the case of the subpixels for green, red, and blue, color filters for green, red, and blue, respectively, are further provided. On the other hand, in the case of the subpixel for white, white light is output and thus a separate color filter is unnecessary.

On the other hand, in the drawings, as the scan switching element SW1 and the drive switching element SW2, p-type MOSFETs are illustrated, but it is also possible that n-type MOSFETs, or switching elements, such as JETs, IGBTs, or SICs, are used.

On the other hand, the controller 170 may perform automatic current limit (ACL) so that the luminance of the image is limited to be not higher than a predetermined luminance.

Here, the automatic current limit (ACL) may be a method for lowering the luminance of the overall screen by determining an average picture level (APL) of the OLED panel 310 by summing the total data values for displaying a video on the OLED panel 310, adjusting the light emitting period according to the level of the average picture level, or controlling the driving current by changing the video data itself.

On the other hand, when the driving current supplied to the OLED panel 310 is high, the temperature of the display 180 may become excessively high.

In particular, even if the controller 170 limits the maximum value of the current supplied to the OLED panel 310 by performing the automatic current limit (ACL) to the current limit value, the current supplied to the OLED panel 310 may be maintained at the current limit value for a predetermined time or longer according to the characteristics of the output video. In this case, the temperature of the OLED panel 310 may be excessively high. For example, the characteristics of the output video may include a case where the output image includes a plurality of secondary colors or tertiary colors, such as animation, a case where a video mode is a vivid mode, and the like.

The display apparatus 100 according to the embodiment can adjust the current limit value based on the information about the current supplied to the OLED panel 310.

The above-described display 180 has been described as including the organic light emitting panel 310. However, in the embodiment, the technical details of the embodiment described below may be included in a panel in which an afterimage may be generated due to deterioration, such as the display 180 including a liquid crystal display panel.

Figure 7:
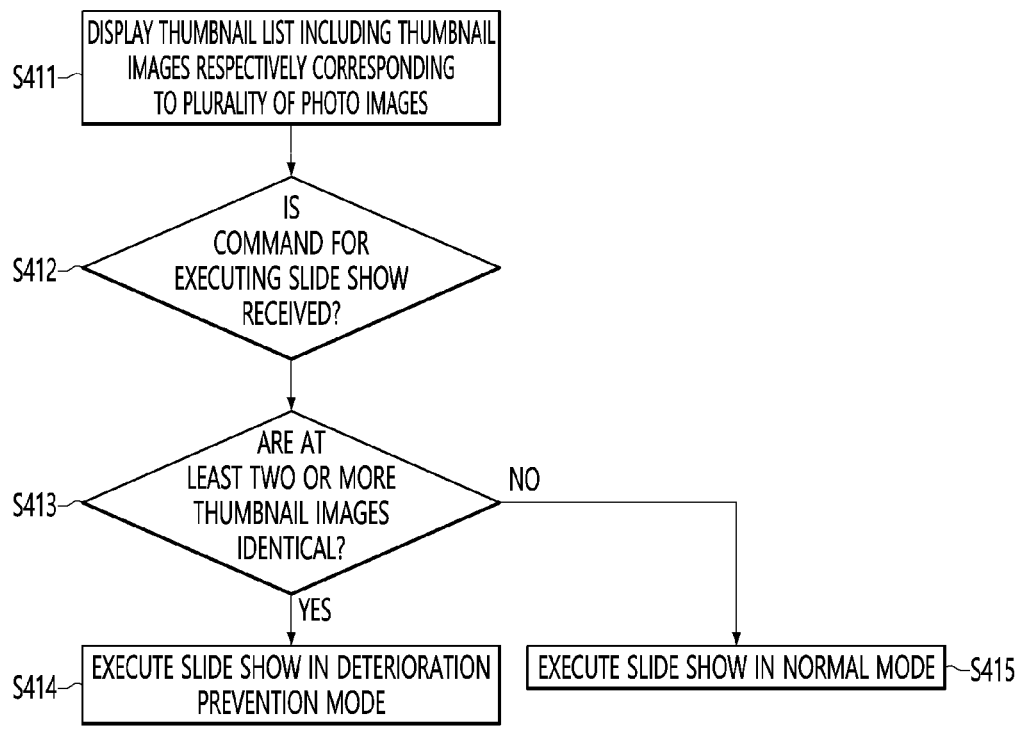
FIG. 7 is a flowchart illustrating a method of controlling a display device according to a first embodiment.

FIG. 7 is a flowchart illustrating a method of controlling a display device according to a first embodiment.

Referring to FIGS. 1 and 7, the controller 170 may display a thumbnail list including thumbnail images respectively corresponding to a plurality of photo images (S411).

The controller 170 may store the plurality of photo images in the memory 140 in correspondence with the thumbnail list.

Figure 8:
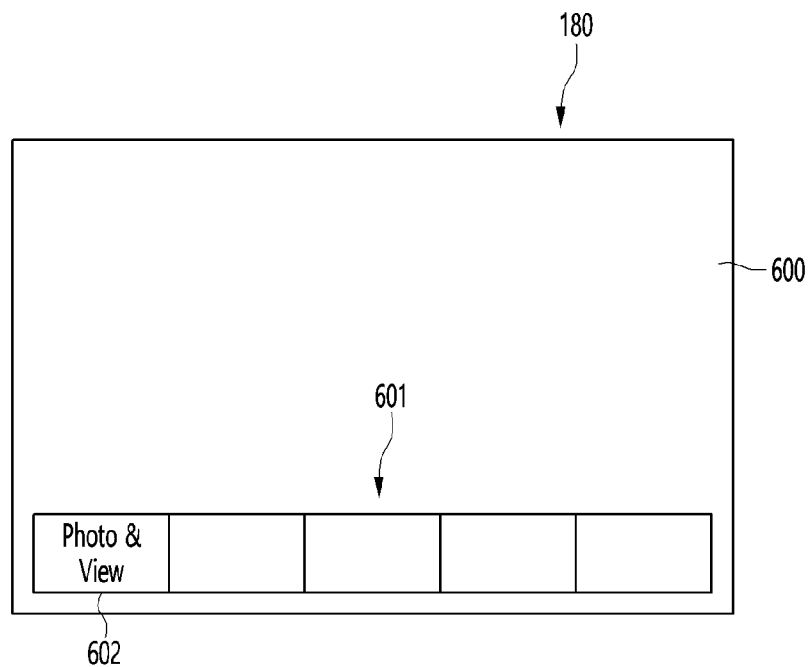
FIG. 8 shows a state in which a plurality of application icons is displayed on a display.

As shown in FIG. 8, the controller 170 may control the display 180 so as to display a plurality of application items 601 including a photo viewer application item 602. The plurality of application items 601 are, for example, located on the lower portion of a screen 600, but are not limited thereto. Broadcast images or content may be displayed on the screen 600 regardless of the display of the plurality of application items 601. When a command for selecting each of the plurality of application items 601 is received, the controller 170 may execute an application corresponding to the corresponding application item 601.

Figure 9:
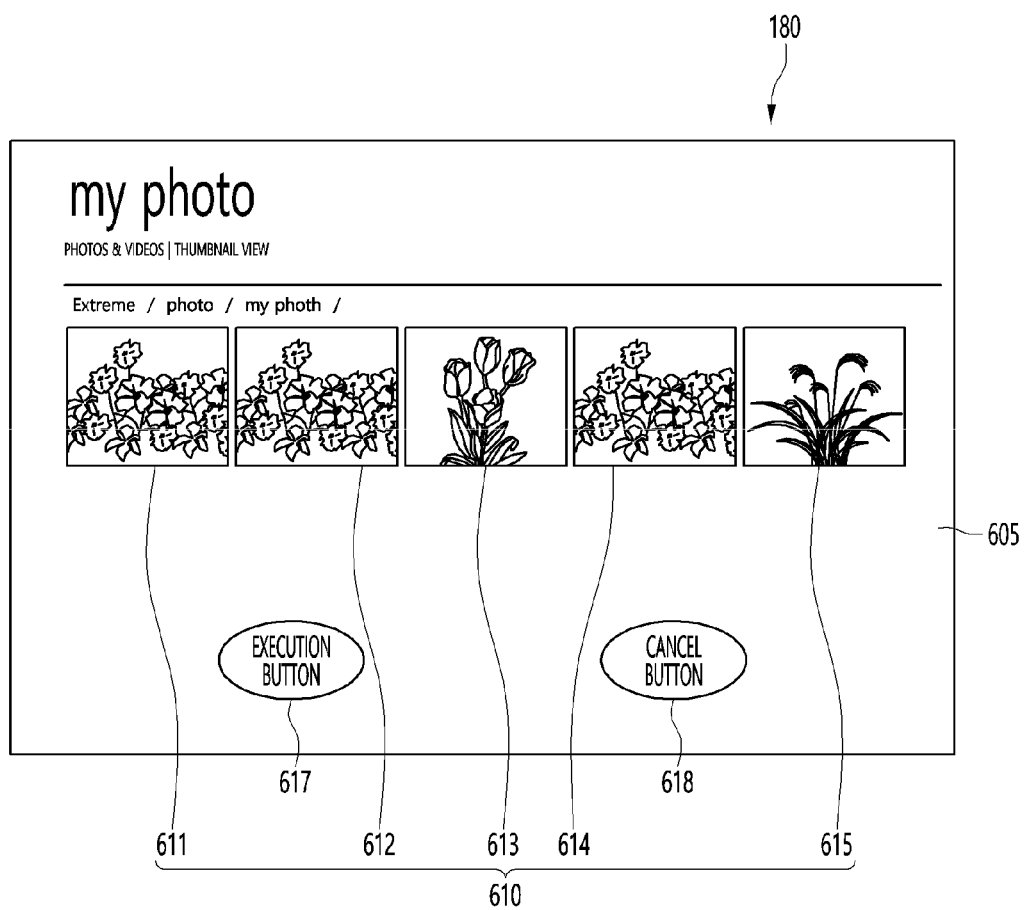
FIG. 9 shows a state in which a thumbnail list is displayed on a display.

When a command for selecting the photo viewer application item 602 is received, the controller 170 may execute the photo viewer application 602 corresponding to the item 602 as shown in FIG. 9 to display the thumbnail list 610 including a plurality of thumbnail images 611 to 615 on the screen 605. The thumbnail images 611 to 615 may be photo images or moving images.

In addition, an execution button item 617 and a cancel button item 618 may be displayed on a portion of the screen 605. For example, the action button item 617 and the cancel button item 618 may be located below the thumbnail list on the screen, but are not limited thereto.

The execution button item 617 may be an item for executing a slide show for a plurality of thumbnail images, and the cancel button item 618 may be an item for canceling execution of a slide show or execution of a corresponding photo viewer application.

Although the plurality of thumbnail images 611 to 615 are illustrated as being positioned along one direction in FIG. 9, the plurality of thumbnail images 611 to 615 may be arranged in a matrix form or in other shapes.

The controller 170 may obtain whether a command for executing a slide show is received (S412).

As shown in FIG. 9, the controller 170 may obtain whether a command for selecting the execution button item 617 or a command for selecting the cancel button item 618 is received. For example, when receiving a command for selecting the execution button item 617, the controller 170 may recognize the command as a command for executing a slide show.

When the slide show is executed, the controller 170 may obtain whether at least two or more thumbnail images are identical to each other (S413).

As shown in FIG. 9, when receiving a command for selecting the execution button item 617, the controller 170 may execute a slide show for the plurality of thumbnail images 611 to 615.

Before executing the slide show, the controller 170 may obtain whether at least two or more thumbnail images of the plurality of thumbnail images are identical to each other (S413).

According to an embodiment, the controller 170 may compare the luminance or colors of pixels of the thumbnail images to obtain whether at least two or more thumbnail images are identical to each other. For example, when there is no difference in luminance of pixels or no color of pixels as a result of comparing the two thumbnail images, the controller 170 may determine that the two thumbnail images are identical to each other.

For example, when the number of pixels having a difference in luminance or color is less than or equal to a set ratio with respect to the total number of pixels as a result of comparing two thumbnail images, the controller 170 may determine that the two thumbnail images are identical to each other. The set ratio may be, for example, 10%, but is not limited thereto. In other words, when 90% of thumbnail images among all thumbnail images are identical, it may be determined that at least two thumbnail images are identical to each other.

For example, it is assumed that each of two thumbnail images has 100 pixels. When there is a difference in luminance of 8 pixels among 100 pixels of at least two thumbnail images, the controller 170 may determine that at least two thumbnail images are identical to each other.

According to the embodiment, it is determined whether or not a plurality of photo images are identical based on thumbnail images having a small capacity instead of the photo images having a large capacity, thus reducing computational burdens.

On the other hand, when the number of the same thumbnail images is at least 30% or more of the number of the plurality of thumbnail images, the controller 170 may determine a corresponding mode as a deterioration prevention mode. When there are ten photo images and four photo images among the ten photo images are identical, the controller 170 may determine a corresponding mode as the deterioration prevention mode.

When at least two or more thumbnail images are identical, the controller 170 may display a plurality of photo images by executing the slide show in the deterioration prevention mode (S414).

The deterioration prevention mode may be a mode in which an afterimage is not generated by preventing deterioration caused by continuously displaying an image having the same luminance or color as a still image. The deterioration prevention mode may be applied to, for example, a still image or a case in which there is a slight difference in luminance or color between adjacent images, which are not still images.

In the deterioration prevention mode, the luminance value of a photo image may be periodically decreased and the photo image is then displayed, or a black screen may be displayed instead of the photo image. In other words, in the deterioration prevention mode, the maximum luminance value set in the display 180 may be decreased from a first luminance value (N11 in FIG. 12) to a second luminance value (N21 in FIG. 12) with the passage of time.

When at least two or more thumbnail images are not identical, the controller 170 may execute a slide show in a normal mode to display a plurality of photo images (S415).

The normal mode is a mode that does not operate in a deterioration prevention mode, and may be applied when a general image is displayed.

In the normal mode, the maximum luminance value set in the display 180 may not be changed but may be fixed. That is, in the normal mode, the maximum luminance value set in the display 180 may be constantly maintained at the first luminance value (N11 in FIG. 12) regardless of the passage of time.

In the present embodiment, it is possible to analyze a plurality of thumbnail images for a slide show before executing the slide show, select one of the normal mode and the deterioration prevention mode, and execute the slide show in the selected mode to display a corresponding plurality of photo images, thus improving image quality by preventing afterimages from occurring.

Figure 10:
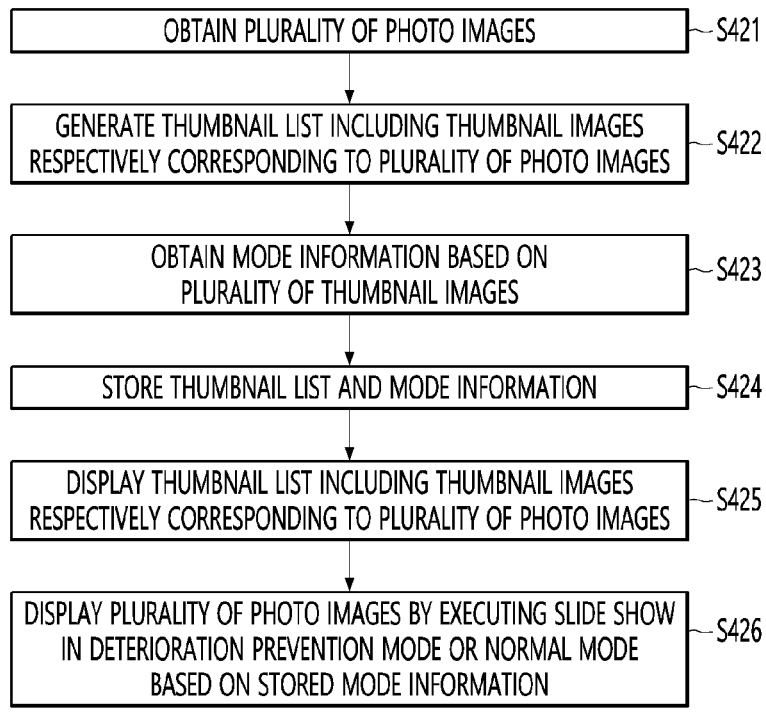
FIG. 10 is a flowchart illustrating a method of controlling a display device according to a second embodiment.

FIG. 10 is a flowchart illustrating a method of controlling a display device according to a second embodiment.

In a first embodiment, it is possible to obtain whether at least two or more thumbnail images of a plurality of thumbnail images are identical, and accordingly execute the slide show in the normal mode or deterioration prevention mode, when receiving a command for executing the slide show.

On the other hand, in a second embodiment, information on whether two or more thumbnail images of a plurality of thumbnail images are identical is stored in the memory 140 before executing the slide show and the slide show may be executed in the normal mode or the deterioration prevention mode based on the corresponding information stored in the memory 140 when a command for executing the slide show is received.

Hereinafter, the second embodiment will be described in detail with reference to FIG. 10.

Referring to FIGS. 1 and 10, the controller 170 may obtain a plurality of photo images (S421).

For example, a plurality of photo images may be obtained by photographing a subject with a camera or a device equipped with a camera. For example, a plurality of photo images may be obtained from a wired network or a wireless network through the network interface 133. For example, a plurality of photo images may be obtained from a mobile device through the wireless transceiver 173. For example, a plurality of photo images may be obtained through capture by the display device itself. In addition, a plurality of photo images may be obtained in various ways.

The controller 170 may generate a thumbnail list including thumbnail images respectively corresponding to the plurality of photo images (S422).

A thumbnail image may be a reduced image of a relevant photo image. The controller 170 may generate thumbnail images respectively corresponding to a plurality of photo images, and generate a thumbnail list based on the generated thumbnail images. Since a process of creating a thumbnail image has been known, a description thereof will be omitted.

The controller 170 may obtain mode information based on the plurality of thumbnail images (S423).

The controller 170 may analyze the luminance or colors of pixels of a plurality of thumbnail images to determine whether at least two or more thumbnail images are identical to each other. Since the method of obtaining whether two or more thumbnail images are identical has been described in S413, a detailed description thereof will be omitted. In addition, the controller 170 may obtain one of the normal mode and the deterioration prevention mode as a mode for executing the slide show based on the obtained result.

The controller 170 may store the thumbnail list and the obtained mode information in the memory 140 (S424).

The obtained mode information may be stored in correspondence with the corresponding thumbnail list.

Thereafter, when receiving a command for selecting an application item, the controller 170 may perform control such that the display 180 displays the thumbnail list stored in the memory 140 (S425).

Thereafter, when receiving a command for executing the slide show, the controller 170 may execute the slide show in the corresponding mode based on the mode information (S426).

Specifically, when receiving a command for executing a slide show, the controller 170 may obtain mode information stored in correspondence to the displayed thumbnail list, and execute a slide show in the normal mode or deterioration prevention mode based on the obtained mode information to display a plurality of photo images.

For example, when the mode information stored in the memory 140 in S424 is the deterioration prevention mode, the controller 170 may execute the slide show in the deterioration prevention mode to display a plurality of photo images respectively corresponding to a plurality of thumbnail images of the displayed thumbnail list.

Hereinafter, a method of operating in the deterioration prevention mode will be described in detail with reference to FIGS. 11 to 16.

(First Embodiment of Deterioration Prevention Mode)

Figure 11:
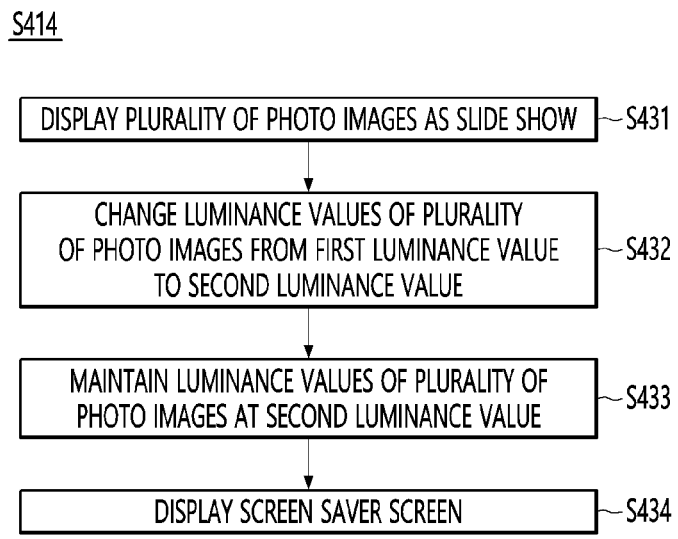
FIG. 11 is a first flowchart illustrating S414 of FIG. 7 in detail.

FIG. 11 is a first flowchart illustrating S414 of FIG. 7 in detail.

Referring to FIGS. 1 and 11, the controller 170 may display a plurality of photo images as a slide show (S431). The plurality of photo images displayed in the slide show may be operated in the deterioration prevention mode, and at least two or more photo images of the plurality of photo images may be identical to each other.

When a plurality of photo images including the same two or more photo images are displayed as a slide show, deterioration may occur. In the embodiment, when a plurality of photo images including the same two or more photo images are displayed as a slide show, the deterioration prevention mode is operated to prevent deterioration from occurring even when the plurality of photo images including the same photo images are displayed as a slide show, thus improving image quality.

Figure 12:
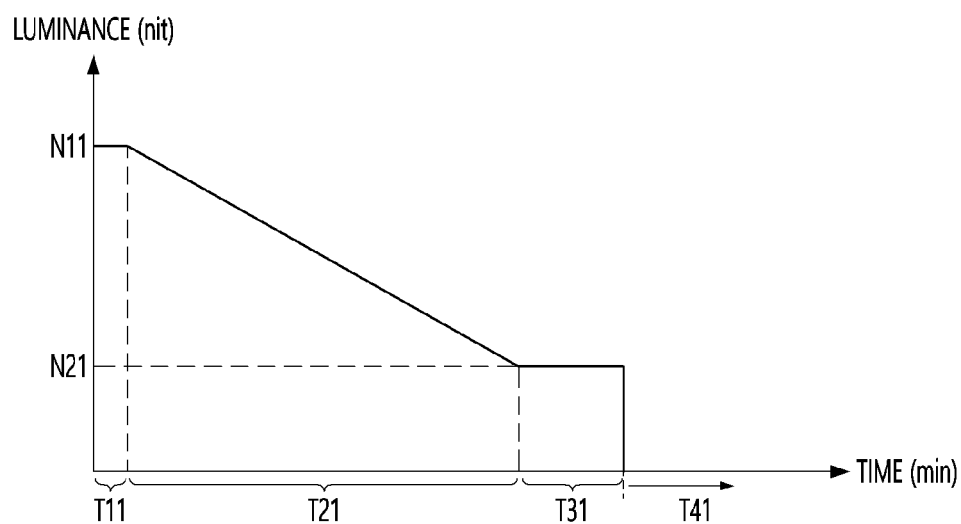
FIG. 12 shows a change in luminance with time when a display device operates in a deterioration prevention mode in FIG. 11.

Referring to FIG. 12, the controller 170 may display the plurality of photo images as a slide show during a first time period T11. Accordingly, a user may view the plurality of photo images displayed as a slide show during the first time period T11. For example, the controller 170 may display a plurality of photo images one by one on the display 180 during the first time period T11. For example, when the time period during which one photo image is displayed on the display 180 is "t", a first photo image is displayed on the display 180 during t1, a second photo image is displayed on the display 180 during t2, and a third photo image may be displayed on the display 180 during t3.

The first time period T11 may be relatively short, for example, within 2 minutes. The first time period T11 may be, for example, a minimum time period for preventing deterioration. In general, it is known that deterioration occurs when a still image is displayed for 2 minutes or more. Accordingly, it is possible to prevent deterioration from occurring by setting the first time period T11 to within 2 minutes.

Figure 13:
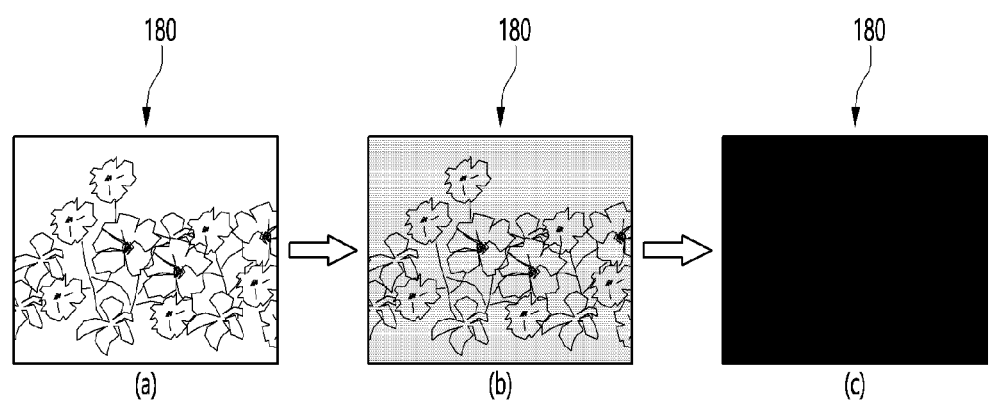
FIG. 13 shows a change in screen display with time when a display device operates in a deterioration prevention mode in FIG. 11.

Referring to FIGS. 12 and 13 (a), a photo image may be displayed on the display 180 based on a normal luminance value (first luminance value N11) during the first time period T11. That is, the first luminance value N11 may be fixed during the first time period T11. For example, the first luminance value N11 may be the maximum luminance value set in the display 180. For example, the minimum luminance value may be 0. In this case, each pixel of the photo image may be displayed with a luminance value determined between the minimum luminance value and the first luminance value N11. For example, when the minimum luminance value is 0 nit and the first luminance value N11 is 200 nits, each pixel of the photo image may be displayed with a luminance value determined between 0 nits and 200 nits.

The controller 170 may change the luminance values of a plurality of photo images from the first luminance value to a second luminance value (S432).

As shown in FIG. 12, the controller 170 may change the luminance value of the photo image displayed on the display 180 during the second time period T21 from the first luminance value N11 to the second luminance value N21. For example, the second luminance value N21 may be 30% to 60% of the first luminance value N11. For example, when the first luminance value N11 is 200 nits, the second luminance value N21 may be 60 nits to 120 nits.

Therefore, since the photo image is displayed with a luminance value determined between the minimum luminance value and the second luminance value N21 during the second time period T21, the photo image displayed during the first time period T11 may be much darker than the photo image displayed during the first time period T11 (FIG. 13(b)).

The second time period T21 may be, for example, 30 minutes to 40 minutes.

The luminance values of the plurality of photo images executed as a slide show may be linearly decreased from the first luminance value N11 to the second luminance value N21. Accordingly, the plurality of photo images displayed on the display 180 during the second time period T21 may gradually darken with the passage of time.

As another example, the luminance values of a plurality of photo images executed as a slide show may be non-linearly or curvedly decreased from the first luminance value N11 to the second luminance value N21. For example, when the second time period T21 includes a 2-1-th time period and a 2-2-th time period, the luminance values of the plurality of photo images displayed on the display 180 may be decreased rapidly during the 2-1-th time period, and may be decreased gently during the 2-2-th time period. For example, the luminance values of the plurality of photo images displayed on the display 180 may be decreased gently during the 2-1-th time period, and may be decreased rapidly during the 2-2-th time period.

According to an embodiment, an audiovisual effect for the photo images of the slide show may be provided by changing the luminance values of the plurality of photo images.

For example, when the luminance values of a plurality of photo images are suddenly decreased, it may cause inconvenience to a user who enjoys a slide show. Accordingly, by gradually decreasing the luminance values of the plurality of photo images to such an extent that the user does not recognize it, it is possible to prevent the user from being inconvenient.

In an embodiment, when the deterioration prevention mode is operated, it is possible to preventing deterioration and reduce power consumption by decreasing the luminance values of the plurality of photo images displayed on the display 180 from the first luminance value N11 to the second luminance value N21.

The controller 170 may maintain the luminance values of the plurality of photo images at the second luminance values (S433).

As shown in FIG. 12, the luminance values of the plurality of photo images may be maintained at the second luminance value N21 during the third time period T31. The third time period T31 may be, for example, 2 minutes or longer. The third time period T31 may be 2 minutes to 5 minutes.

The controller 170 may display a screen saver screen (S434).

As shown in FIG. 12, the screen saver screen may be displayed during a fourth time period T41 after the third time period T31.

As another example, the screen saver screen may be displayed within the third time period T31.

The screen saver screen may be a black screen or a screen including a video on a black background, as shown in FIG. 13(c).

Figure 17:
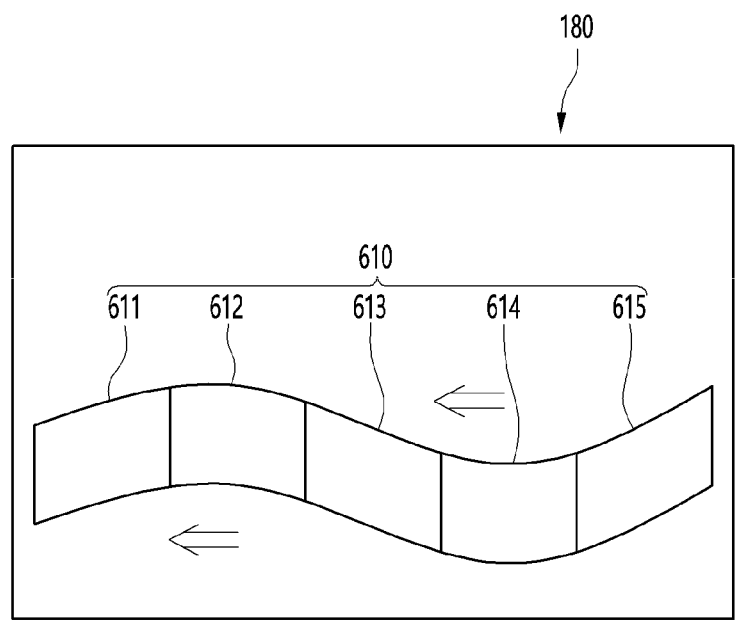
FIG. 17 shows a state in which thumbnail images are displayed as a slide show on a screen saver screen in (c) of FIG. 13.

Meanwhile, as shown in FIG. 17, the screen saver screen may include a thumbnail list 610 including a plurality of thumbnail images 611 to 615 that move like waves. Therefore, even when a user cannot see a plurality of photo images because the screen saver screen is displayed, a plurality of thumbnail images corresponding to the plurality of photo images are included in the screen saver screen, so that the user can easily figure out the photo image information in the slide show, thus improving user convenience.

In an embodiment, a screen is switched to the screen saver screen after a predetermined period of time (T11, T21, or T31), thereby preventing deterioration and reducing power consumption.

(Second Embodiment of Deterioration Prevention Mode)

Figure 14:
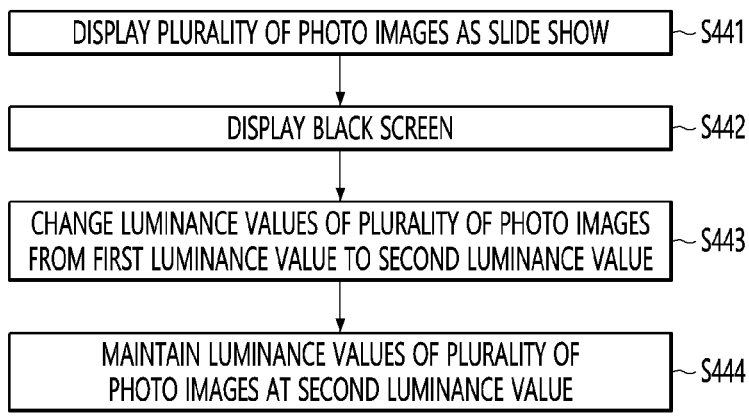
FIG. 14 is a second flowchart illustrating S414 of FIG. 7 in detail.

FIG. 14 is a second flowchart illustrating S414 of FIG. 7 in detail.

Referring to FIGS. 1 and 14, the controller 170 may display a plurality of photo images as a slide show (S441).

Figure 15:
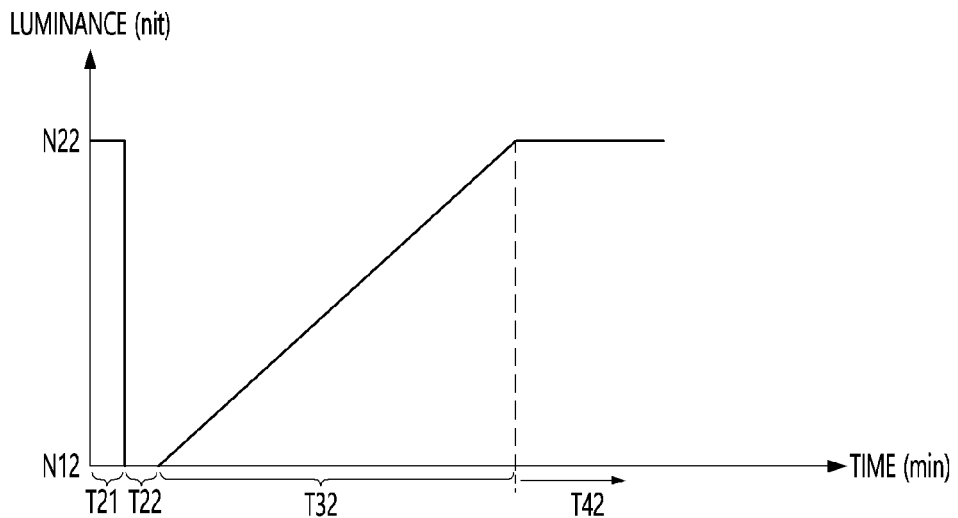
FIG. 15 shows a change in luminance with time when a display device operates in a deterioration prevention mode in FIG. 14.

Referring to FIG. 15, the controller 170 may display the plurality of photo images as a slide show during a first time period T21. As shown in (a) of FIG. 16, a plurality of photo images may be displayed with a luminance value (N22, second luminance value) set in a display.

Since S441 is the same as S431 of FIG. 11, a detailed description thereof will be omitted.

The first time period T21 may be relatively short, for example, within 2 minutes. The first time period T21 may be, for example, a minimum time period for preventing deterioration. In general, it is known that deterioration occurs when a still image is displayed for 2 minutes or more. Accordingly, it is possible to prevent deterioration from occurring by setting the first time period T21 to within 2 minutes.

The controller 170 may display a black screen (S442).

As shown in FIG. 15, the black screen may be displayed during the second time period T22. That is, during the second time period T22, the display 180 may display an image having a first luminance value N12. The first luminance value N12 may be, for example, 0, that is, black, but is not limited thereto.

Figure 16:
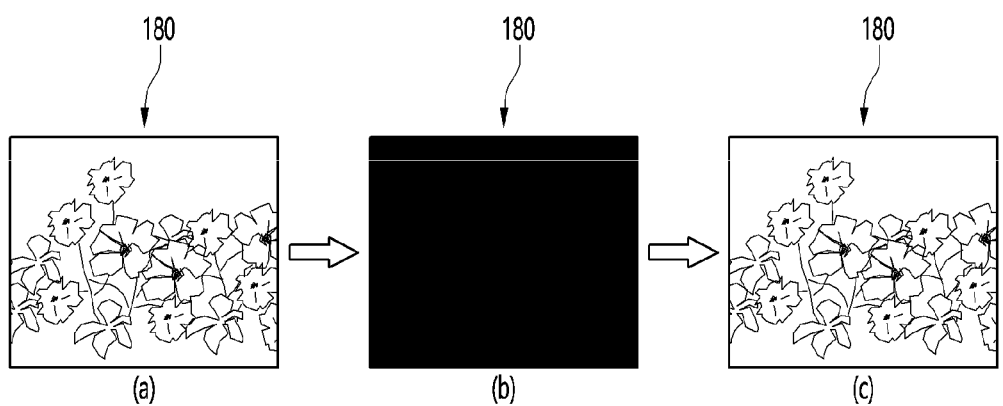
FIG. 16 shows a change in screen display with time when a display device operates in a deterioration prevention mode in FIG. 14.

As shown in (b) of FIG. 16, it may be a black screen. For example, the second time period T22 may be 1 minute to 3 minutes.

The controller 170 may change the luminance values of a plurality of photo images from the first luminance value N12 to a second luminance value (S443).

As shown in FIG. 15, the controller 170 may change the luminance values of the plurality of photo images from the first luminance value N12 to the second luminance value N22 during a third time period T32.

The third time period T32 may be, for example, 30 minutes to 40 minutes. Accordingly, the plurality of photo images displayed on the display 180 during the third time period T32 may gradually brighten with the passage of time.

The luminance values of the plurality of photo images displayed on the display 180 may be increased linearly, for example, but may also be increased non-linearly or curvedly. For example, when the third time section T32 includes a 3-1-th time period and a 3-2-th time period, the luminance values of the plurality of photo images displayed on the display 180 may be increased rapidly during the 3-1-th time period, and may be increased gently during the 3-2-th time period. For example, the luminance values of the plurality of photo images displayed on the display 180 may be gently increased during the 3-1-th time period, and may be increased rapidly during the 3-2-th time period.

According to an embodiment, an audiovisual effect for the photo images of the slide show may be provided by changing the luminance values of the plurality of photo images. That is, audiovisual curiosity and interest of the user may be aroused by displaying a black screen for the screen saver screen for a time period T22 which is relatively short and then gradually brightly displaying a plurality of photo images as a slide show.

When the deterioration prevention mode is operated according to an embodiment, it is possible to prevent deterioration and reduce power consumption by displaying a plurality of photo images displayed on the display 180 on a black screen for the screen saver screen.

The controller 170 may maintain the luminance values of the plurality of photo images at the second luminance values (S444).

As shown in FIG. 15, the luminance values of the plurality of photo images may be maintained at the second luminance value N22 during the fourth time period T42. As shown in (c) of FIG. 16, a plurality of photo images may be displayed with a luminance value set in the display 180.

Since deterioration may occur when the luminance values of the plurality of photo images are continuously maintained at the second luminance value N22. the controller 170 may again perform deterioration prevention operation according to S442 and S443 when the slide show is not stopped or canceled for a certain period of time. For example, the fourth time period T42 may be identical to the first time period T21. For example, the first time period T21 may be 2 minutes or less. Accordingly, when the slide show is not stopped or canceled during the fourth time period T42 corresponding to 2 minutes, the process may move to S442. This process may be repeatedly performed as long as the slide show is not stopped or canceled.

On the other hand, for example, as in the first embodiment of the deterioration prevention mode (FIGS. 11 to 13), when a slide show is executed in the deterioration prevention mode or when a screen saver screen is displayed, the user may forget that the slide show is executed or think that the power of the display device is turned off and leave the display device unattended for a long time, resulting in power consumption. Further, among user, there may be a user who wants to view the slide show again in a section (R21 in FIG. 12) in which the screen saver screen is displayed or the slide show is executed in the deterioration prevention mode and the luminance value of the photo image is gradually decreased.

A solution to solve this issue will be described with reference to FIG. 18.

Figure 18:
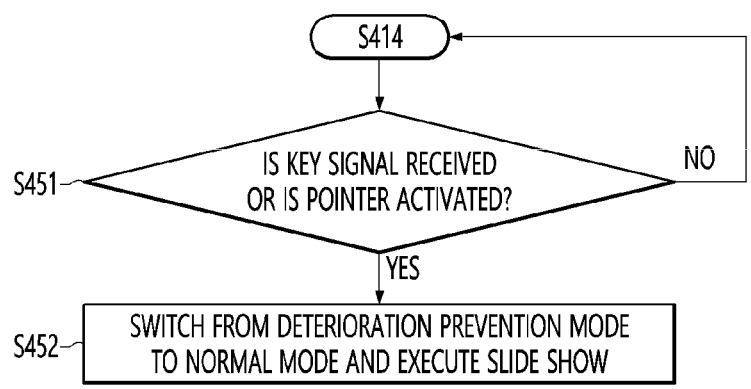
FIG. 18 is a flowchart illustrating a method of switching from a deterioration prevention mode to a normal mode.

FIG. 18 is a flowchart illustrating a method of switching from a deterioration prevention mode to a normal mode.

Referring to FIGS. 1 and 18, the controller 170 may receive a key signal or obtain whether a pointer is activated (S451).

For example, the controller 170 may obtain whether the user input interface 150 receives a key signal from the remote control device 200.

For example, the controller 170 may obtain whether the pointer (205 in FIG. 4) displayed on the display 180 is activated. For example, when the pointer 205 interworks with the remote control device 200, the corresponding pointer 205 may be activated in response to a command for selecting a specific button key of the remote control device 200.

The controller 170 may switch from the deterioration prevention mode to the normal mode and execute the slide show (S452).

When the key signal is received or the pointer is activated, the controller 170 may switch from the deterioration prevention mode to the normal mode. The operation in the deterioration prevention mode has been described with reference to FIGS. 11 to 17. That is, in the deterioration prevention mode, the luminance value of a photo image may be periodically decreased and the photo image is then displayed, or a black screen may be displayed instead of the photo image. In other words, in the deterioration prevention mode, the maximum luminance value set in the display 180 may be decreased from a first luminance value N12 to a second luminance value N21 over time (FIG. 12).

On the other hand, in the normal mode, the maximum luminance value set in the display 180 may not be changed but may be fixed. That is, in the normal mode, the maximum luminance value set in the display 180 may be constantly maintained at the first luminance value N12 regardless of the passage of time.

Therefore, the switching from the deterioration prevention mode to the normal mode may mean switching from a mode in which the maximum luminance value set in the display 180 is periodically decreased from the first luminance value N12 to the second luminance value N21 to a mode in which the luminance value N12 is maintained regardless of the passage of time.

Since an operation when the slide show is executed in the normal mode has been described in S415 shown in FIG. 7, it can be easily understood from the description of S415.

For example, as shown in FIG. 12, when the key signal is received or the pointer is activated at a specific time point in any one of the second time period T21, the third time period T31, and the fourth time period T41 during which the slide show is executed in the deterioration prevention mode, the controller 170 may switch from the deterioration prevention mode to the normal mode and execute the slide show.

As another example, as shown in FIG. 15, when the key signal is received or the pointer is activated at a specific time point in any one of the second time period T22 and, the third time period T32 during which the slide show is executed in the deterioration prevention mode, the controller 170 may switch from the deterioration prevention mode to the normal mode and execute the slide show.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment.

The scope of protection of the present disclosure should be interpreted by the following claims, and all technical ideas within the scope equivalent thereto should be construed as being included in the scope of the present disclosure.

The embodiments may be used in an apparatus or device including a display device.

The invention claimed is:
1. A display device comprising:
a display configured to display a thumbnail list including thumbnail images respectively corresponding to a plurality of photo images; and
a controller configured to execute a slide show in one of a normal mode and a deterioration prevention mode,
wherein the controller is configured to:
obtain whether at least two or more thumbnail images of the plurality of thumbnail images are identical, and
display the plurality of photo images on the display by executing the slide show in the deterioration prevention mode in which a luminance of the two or more thumbnail images is non-linearly decreased from a first luminance used to display a previous thumbnail image in the slide show to a second luminance non-linearly decreased from the first luminance, when the at least two or more thumbnail images of the plurality of thumbnail images are identical, and display the plurality of photo images on the display by executing the slide show in the normal mode in which the luminance of the thumbnail images in the slide show are maintained at the first luminance, wherein the non-linearly decrease in the luminance of the two or more thumbnails includes decreasing the luminance during a first time period a greater amount than during a second time period following the first time period.

2. The display device of claim 1, wherein the first luminance value is a luminance value set in the display, and wherein the second luminance value is 30% to 60% of the first luminance value.

3. The display device of claim 1, wherein the controller is configured to:

maintain luminance values of the plurality of photo images at the second luminance value during a third time period, and display a screen saver screen on the display.

4. The display device of claim 3, wherein the controller is configured to display the screen saver screen on the display during any one of a time period within the third time period and a time period after the third time period.

5. The display device of claim 1, wherein the controller is configured to display the plurality of photo images as the slide show during a first time period and display a screen saver screen on the display during a second time period when the at least two or more thumbnail images of the plurality of thumbnail images are identical.

6. The display device of claim 5, wherein the luminance value of the screen saver screen is 0, wherein the controller is configured to change luminance values of the plurality of photo images from a first luminance value to a second luminance value during a third time period.

7. The display device of claim 6, wherein the first luminance value is a luminance value of the screen saver screen, and wherein the second luminance value is a luminance value set in the display.

8. The display device of claim 5, wherein the controller is configured to display thumbnail images respectively corresponding to the plurality of photo images on the screen saver screen as the slide show when displaying the screen saver screen.

9. The display device of claim 1, wherein the controller is configured to execute the slide show in the deterioration prevention mode when a number of the identical thumbnail images is at least 30% or more of a number of the plurality of thumbnail images.

10. The display device of claim 1, wherein the controller is configured to obtain whether at least two or more thumbnail images of the plurality of thumbnail images are identical when displaying the thumbnail list on the display.

11. The display device of claim 1, further comprising:

a memory configured to store the thumbnail list;

wherein the controller is configured to obtain whether at least two or more thumbnail images of the plurality of thumbnail images are identical when storing the thumbnail list on the memory.

12. The display device of claim 1, further comprising:

a user input interface, wherein the controller is configured to switch from the deterioration prevention mode to the normal mode and execute the slide show in the normal mode to display the plurality of photo images when a key signal is received through the user input interface or a pointer displayed on the display is activated while operating in the deterioration prevention mode.

13. A method for controlling a display device comprising:

displaying a thumbnail list including thumbnail images respectively corresponding to a plurality of photo images on a display;

obtaining whether at least two or more thumbnail images of the plurality of thumbnail images are identical;

displaying the plurality of photo images on the display by executing the slide show in the deterioration prevention mode in which a luminance of the two or more thumbnail images is non-linearly decreased from a first luminance used to display a previous thumbnail image in the slide show to a second luminance non-linearly decreased from the first luminance, when the at least two or more thumbnail images of the plurality of thumbnail images are identical; and displaying the plurality of photo images on the display by executing the slide show in the normal mode in which the luminance of the thumbnail images in the slide show are maintained at the first luminance, wherein the non-linearly decrease in the luminance of the two or more thumbnails includes decreasing the luminance during a first time period a greater amount than during a second time period following the first time period.

14. The method of claim 13, wherein the controlling of the slide show includes changing luminance values of the plurality of photo images from the first luminance value to the second luminance value when at least two or more thumbnail images of the plurality of thumbnail images are identical.

15. The method of claim 14, wherein the first luminance value is a luminance value set in the display, and wherein the second luminance value is 30% to 60% of the first luminance value.

16. The method of claim 14, wherein the controlling of the slide show further includes:

maintaining the luminance values of the plurality of photo images displayed as the slide show at the second luminance value; and displaying a screen saver screen on the display.

17. The method of claim 13, wherein the controlling of the slide show further includes:

displaying the plurality of photo images as the slide show; and displaying a screen saver screen when the at least two or more thumbnail images of the plurality of thumbnail images are identical.

18. The method of claim 17, wherein the controlling of the slide show further includes changing luminance values of the plurality of photo images from the first luminance value to the second luminance value.

19. The method of claim 18, wherein the luminance value of the screen saver screen is 0, wherein the first luminance value is a luminance value of the screen saver screen, and wherein the second luminance value is a luminance value set in the display.

* * * * *